July 6, 1965  K. E. HUMBERT, JR  3,193,101
FLUID BY-PASS FILTER WITH ANTI-DRAINBACK VALVE
Filed Nov. 15, 1956  2 Sheets-Sheet 1
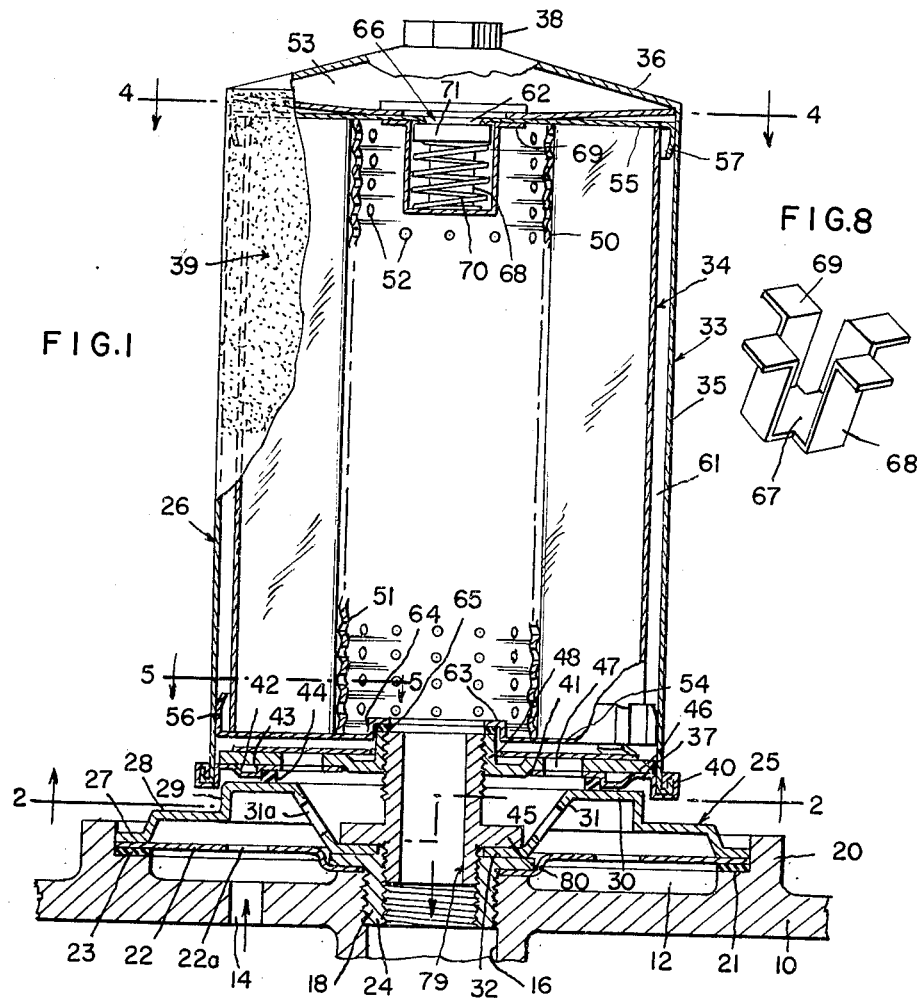
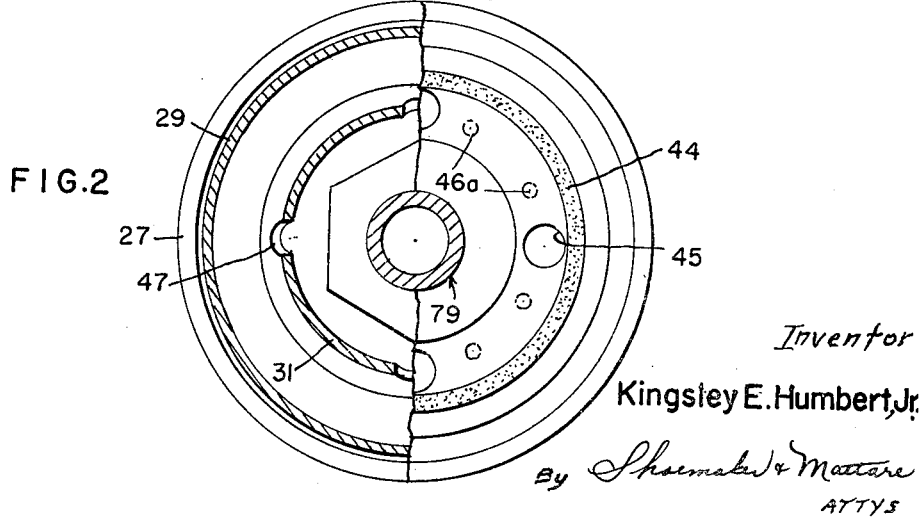
Inventor
Kingsley E. Humbert, Jr.
By Shoemaker & Mattare
ATTYS July 6, 1965  K. E. HUMBERT, JR  3,193,101
FLUID BY-PASS FILTER WITH ANTI-DRAINBACK VALVE
Filed Nov. 15, 1956  2 Sheets-Sheet 2
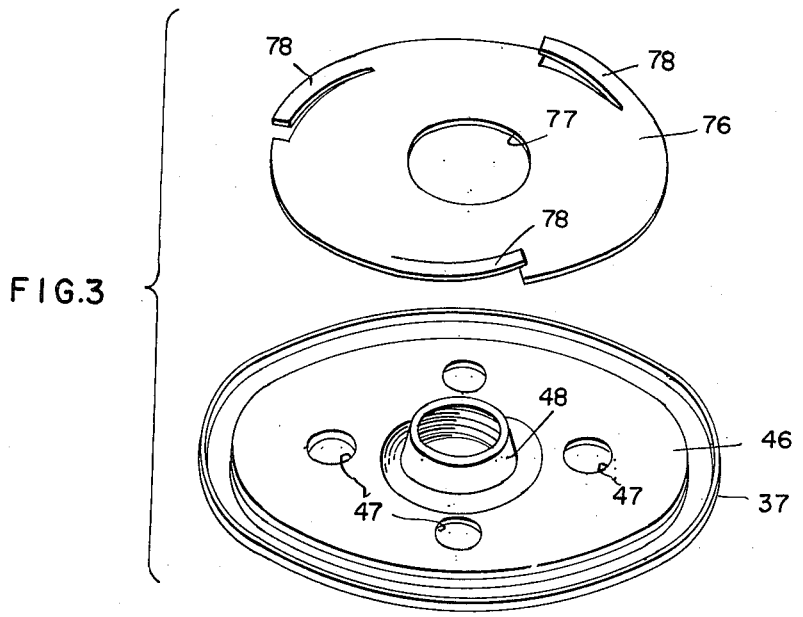
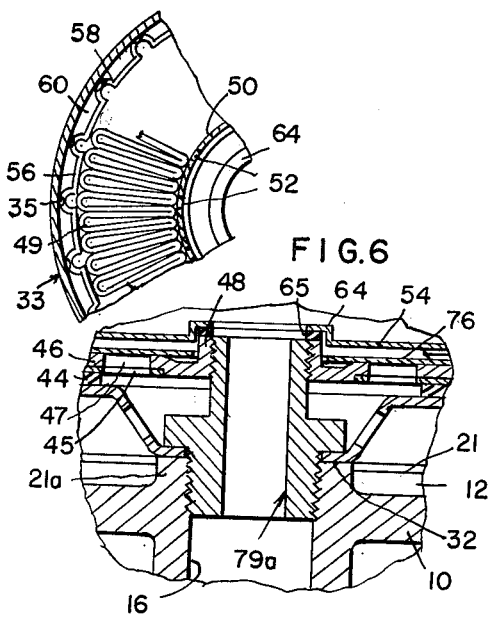
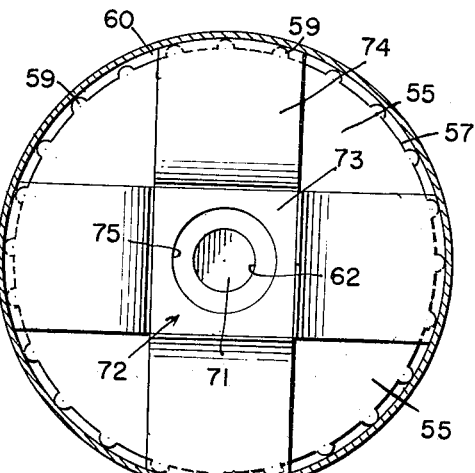
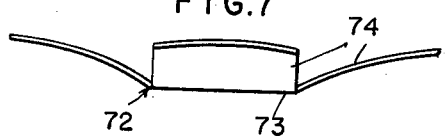
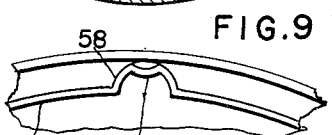
Inventor
Kingsley E. Humbert, Jr.
By Shoemaker & Mattare
ATTYS

United States Patent Office 3,193,101
Patented July 6, 1965

3,193,101
FLUID BY-PASS FILTER WITH ANTI-DRAINBACK VALVE
Kingsley E. Humbert, Jr., Gastonia, N.C., assignor to Wix Corporation, Gastonia, N.C., a corporation of North Carolina
Filed Nov. 15, 1956, Ser. No. 622,477
8 Claims. (Cl. 210—130)

This invention relates generally to filter devices and is directed particularly to an improved filter for use upon internal combustion engines, more especially engines of the type wherein a mounting plate is employed over an inlet and outlet port leading to and from the oil gallery of the engine.

In certain makes or types of motor vehicles, there are employed filters of the full-flow type wherein the engine oil is pumped out from the engine into the filter and flows freely therethrough and directly back to the oil gallery for re-use. In such full-flow systems the oil is unrestricted in its passage to the filter and back to the engine and the flow is maintained at the proper rate or volume so long as the filter does not become filled or clogged to any appreciable extent. However, such filters after a period of time do become clogged from dirt particles and substances produced in the oil, and the flow is then cut down and greater pressure is required to force the oil through the filter. Eventually the condition of the filter becomes such that the oil flow stops and when this happens there is no means by which the oil, even in its unfiltered state, can return to the oil gallery and the engine bearings become damaged as a consequence if the filter is not replaced in a reasonable time.

Sometimes, on the other hand, full flow filters are equipped with pressure relief devices of a so-called "permanent" nature. These devices after use often become stuck in the open or shut position or so etched, by the acids in the oil, as to render them ineffective. When they are stuck shut they provide no pressure relief and when they are stuck open or severely disfigured they endanger the bearings and other moving parts in the engine by continuously by-passing the filter with unfiltered oil.

In view of the foregoing, a particular object of the present invention is to provide an improved replaceable filter structure which is so designed that when the filtering medium becomes clogged or filled to the point where passage of oil therethrough is substantially checked, a by-pass passage becomes available to return the unfiltered oil directly to the oil gallery so that if the filter is not replaced in a reasonable time, no material damage will be done to the engine parts.

In certain makes of automobile engines the filter is mounted over a plate which is positioned within an oil receiving recess in the wall of the engine casing and oil discharged from the oil system passes into the recess and through this plate and then to the filter and is returned from the filter through a mounting coupling or nipple which retains the plate in position and also provides a means for connecting the filter to the engine.

Another object of the present invention is to provide an improved replaceable filter which is designed in a novel manner whereby when it is taken off for replacement or when the oil circulation has stopped, it will retain oil or remain filled so that, in the first instance, the oil will not run out when the filter is detached and, in the second instance, there is no delay in the delivery of oil to the engine parts when the engine is started since the oil contained in the filter is immediately available for use.

Another object of the invention is to provide an improved replaceable filter unit which is constructed in a novel manner to maintain a full flow circulation even after the filtering material in the unit has become clogged and will not pass oil.

Still another object of the invention is to provide a replaceable filter structure having within itself a pressure-responsive means which, upon pressure build-up in the filter, due to clogging of the filtering material, will divert the oil around the filter material or filter medium for return to the engine oil gallery.

Another object of the invention is to provide an improved replaceable filter structure having means built therein which admits the oil to the filtering medium when the oil is delivered into the container for the filtering medium under pressure but prevents return flow of the oil by the admission route when the oil pump of the system is not operating.

Still another object of the invention is to provide an improved filter structure wherein the filtering medium is in the form of an elongate annular fluted body which passes the oil from the outside inwardly toward the central passage therethrough, having a spring seated valve at the outer end of the passage through the fluted body which remains closed so long as the filter medium is unclogged to permit the oil to pass radially inwardly to the center thereof for return to the oil gallery but which, when the filter medium becomes clogged, will open under pressure so as to permit the oil to flow into the outer end of the tubular filter body for direct return to the oil gallery.

A further object of the invention is to provide in a new and novel replaceable filtering unit of the character above described, a means carried by the mounting end of the unit for effecting a fluid-tight coupling with a surface of an adapter plate, which means is uniquely designed to resist deformation or blow-out under extreme pressure and also to resist distortion and rupture by the application of excessive twisting pressure thereto, such as might occur in screwing the filtering unit into position.

The invention will be best understood from a consideration of the following detail description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

FIG. 1 is a view in longitudinal section through the improved replaceable filter structure of the present invention showing the same in mounted position on the adapter plate which, with the adjacent part of the engine wall, is also shown in section;

FIG. 2 is a transverse sectional view taken substantially on the line 2—2 of FIG. 1;

FIG. 3 is an exploded perspective view showing the inner end closure wall for the filter medium encasing can, toegther with the non-return valve plate and valve disk which are interposed between the end wall and the filtering medium;

FIG. 4 is a transverse section taken substantially on the line 4—4 of FIG. 1, showing the retainer or filter element positioning spring in the outer end of the can for urging the filter element toward the valve disk;

FIG. 5 is a fragmentary detail section taken substantially on the line 5—5 of FIG. 1;

FIG. 6 is a section corresponding to the sectioned portion of the coupling union or nipple shown in FIG. 1, but illustrating the connection of the nipple directly with the wall of the engine block instead of being connected with the conventional threaded nipple at present employed for retaining the filter element in position;

FIG. 7 is a view in side elevation of the retainer or element positioning spring;

FIG. 8 is a detail perspective view of the spring supporting spider for the by-pass valve in the outer end of the filter body; and FIG. 9 is a detail section on an enlarged scale corresponding to FIG. 5 and illustrating the manner of turning in the raw edges of the ribs of the end plates.

Referring now more particularly to the drawings, the numeral 10 generally designates a portion of the block or oil housing part of an internal combustion engine of a form or construction employed in certain types of motor vehicles, wherein there is provided in the lower part of the engine block a circular oil receiving recess or sump 12 into which the oil outflow passage 14 opens and in the central part of which is the oil inflow port 16 which is screw threaded, as indicated at 18 for the purpose about to be described.

This recess or sump 12 is defined by the annular rim 20 and within the rim and at an elevation above the bottom of the sump is the annular gasket seat 21.

As hereinbefore stated, in oil systems employing an arrangement such as that described, the sump has mounted therein a thin baffle plate 22, the central portion of which is raised slightly while the perimeter rests upon a gasket 23 placed on the seat 21.

The center of the baffle plate has an opening therein which coincides in size or diameter with the outer end of the port 16 and this central portion of the baffle plate rests against the bottom of the sump and the baffle plate is maintained in position by a flanged nipple 24, the flange 25 of which rests upon the top of the baffle plate while the nipple which is both interiorly and exteriorly screw threaded, is threadably engaged in the port 16 with the threads 18.

The present improved filter unit and adapter plate are designed to be mounted directly over or on the baffle plate 22 in the manner above described, or they may be mounted in the sump with the outer portion or perimeter of the improved adapter plate resting on the gasket 23, as will be later described.

The present improved adapter plate is generally designated 25 and the new anti-drain-back filter structure is generally designated 26.

The adapter plate 25 is of the proper diameter to fit within the flange or rim 20 encircling the oil receiving sump and is shaped or formed to have the outer narrow rim portion 27 which seats either directly upon the baffle plate 22 or upon the gasket 23, as will be readily apparent. Inwardly of the rim portion 27 the plate is elevated to form the outwardly offset circular portion 28 and this circular portion in turn joins an outwardly directed circular wall 29 by which it is connected with the outwardly facing deck surface 30.

The inner part of this deck surface 30 which forms a relatively narrow face in the radial direction of the adapter, joins the rearwardly directed frusto-conical wall 31 and this wall at the center of the adapter plate joins the narrow collar portion 32 which is in the same plane as the rim 27 and is adapted to position upon the flange of the nipple 24, as shown, when the adapter plate is mounted directly over the baffle plate in the manner illustrated.

The baffle plate 22 is provided with a liquid passing slot or opening 22ª and the adapter plate 25 is likewise provided with a plurality of openings 31ª in the frusto-conical wall 31, thus providing for the passage of oil outwardly from the port 14 through the baffle plate 22 and through the adapter plate to the filter structure 26 which is mounted upon and secured to the adapter plate 25 in the manner illustrated and about to be described.

The replaceable filter structure 26 embodies an outer receptacle, casing or can 33 which houses the filter body which is generally designated 34.

The can 33 is preferably formed, with the exception of the inner end, from a single body of metal, such as aluminum or the like, by an extrusion process whereby the cylindrical side wall 35 is formed in one piece with the outer end wall 36 while the inner end is closed by the disk wall 37 which is of special form as hereinafter described.

In the formation of the can 33 the outer end wall 36 is domed or shaped to extend outwardly slightly and is provided with the polygonal head 38 which facilitates the application of a wrench to the can if this should be necessary to effect this removal from or emplacement in working position. However, the can may be formed without this head or nut part 38, but may be provided on its outer surface with a suitable rough coating of a paint carrying granular material, as indicated at 39, to facilitate grasping the can so that it can be turned as required to remove it from working position or place it in working position. Such a granule containing paint is well known, being provided for use on ships' decks or other surfaces where it is important that a non-slipping surface be provided and accordingly it is not believed that any further description of the paint in question is required.

The inner end wall 37 is here illustrated as being formed in two parts and such two parts will accordingly be described, but it is to be understood and will be apparent following the description of the illustrated structure, that these two parts may be also formed in one piece, if desired.

The wall 37 is pressed or otherwise suitably forward from a thin or light weight metal such as the metal from which the can is pressed, and it is secured over the open end of the can by roll-beading together the end edge of the can wall 35 and the outer portion or perimeter of the inner end wall 37, as indicated at 40. While this manner of coupling the wall 37 with the inner end of the can is preferred, it is to be understood that the invention is not limited to such a method but that any other suitable means may be provided for joining these two parts together, so long as there is produced a tight or leak-proof connection.

The wall 37 has a central opening 41 and outwardly of this opening and concentric therewith there is formed the annular rib 42 which has an inwardly facing shoulder 43. This rib extends inwardly toward the adapter plate 25 or, in other words, away from the attached can body, so that it lies on the outside of the wall 37 but it does not project beyond the plane of the outer beaded connection 40 between the wall 37 and the can wall 35.

Fixed by means of a suitable adhesive or cement to the outer face of the wall 37 and against the shoulder 43, within the annular rib, is a gasket 44 which has a thickness greater than the height of the rib 42 so that it will extend beyond the rib as shown in FIG. 1 for the purpose of forming a fluid-tight seal with the deck surface 30 of the adapter plate when the filter structure is secured in position on the adapter plate.

Within the area defined by the gasket 44 the wall 37 has a series of fluid passing ports 45 formed therethrough.

Positioned against the inner side of the can inner end wall 37 is a valve plate 46 which is of an overall diameter slightly less than the inside diameter of the can 33 and which is provided with ports 47 which match the openings 45 in the wall 37. The central part of the valve plate 46 is formed integral with an inwardly extending nipple 48 which is internally threaded as shown.

The filter body 34 which is housed in the can 33 is of the annular fluted type which is illustrated and described in prior application Serial No. 497,544, filed March 29, 1955, and now U.S. Patent No. 2,894,630, and it is not believed that a detailed description of this filter body is required other than to state that it is of substantial length and has radially extended folded portions or flutes 49, as shown in FIG. 5, and through the central portion it has the corrugated and apertured supporting tube 50. The corrugations of this supporting tube 50 extend around the body of the tube as indicated at 51 and the apertures 52 are in substantial number to permit a free flow of oil or liquid through the tube to the interior thereof, the apertures preferably being in the valleys of the corrugations so that the oil can flow freely from the filter material into such valleys and into the openings.

The overall diameter of the elongated filter body 34 is somewhat less than the inside diameter of the can for the purpose about to be described, and the length of the filter body is approximately equal to the length of the can wall 33 so that there is left at the outer end of the filter structure the chamber 53 into which oil may flow when necessary, as hereinafter described, to permit a free flow back to the engine oil gallery in the event that the filter material becomes clogged to the extent that no more oil will pass therethrough.

The fluted material of the filter body is secured between the circular inner and outer end plates or caps 54 and 55, respectively. These end plates have an overall diameter approximately equal to the inside diameter of the can and they are provided with the encircling flanges 56 and 57 which are pressed to form the outwardly projecting ribs 58 and 59.

In actual practice, it has been found that vibrations from the engine or motor vehicle on which the filter structure is mounted tends to cause the filter body 34 to turn in the housing or can. The out-pressed portions 58 and 59 forming the above described ribs leave the free edges somewhat sharpened and since they contact the wall of the can, the rotational movement of the filter body therein causes these free edges of the ribs to cut into the wall surface. Accordingly, in order to attain the desired benefits resulting from the formation of the ribs and at the same time avoid this undesirable effect, the edges of the ribs are pressed inwardly slightly as indicated at 58' in FIG. 9 so that the edge of the rib or flange is free from contact with the can wall.

As shown in FIG. 1, the end plates 54 and 55 are arranged to have their flanges opposed or extending over the adjacent side of the fluted filter material and the outer portions of the ribs 58 and 59 of these end plates bear against the inner surface of the can wall 35 so that the fluted filter body is accurately centered therein. The ribs 58 and 59 of the filter body end plates provide between them the spaces 60 which permit the oil to flow into the circular area 61 around the outer side of the fluted filter material. At the inner end of the can the oil which enters the can by way of the openings 45 and 47 may pass through these spaces 60 into the circular area 61 and then flow radially inwardly to the center of the filter and into the reinforcing and supporting tube 50.

The end plates 54 and 55 of the filter body are provided with central openings 62 and 63. The opening 63 in the plate 54 which lies at the inner or attached end of the filter structure, is defined by the inwardly extending annular collar 64 which has secured in it a gasket 65. This opening 63, of course, as shown in FIG. 1, communicates with the perforated supporting tube 50. The plate 55 at the outer end of the filter body is normally closed by a spring pressed valve which is generally dessignated 66, and which comprises a supporting spider which is fixed to the inner side of the plate 55 and which is made up of the plate 67 and a plurality of integral arms 68 which have their ends turned outwardly as at 69 and secured by welding or in any other suitable manner, to the inner side of the plate 55 so that the spider hangs from the plate 55 in the reinforcing tube 50. Within the area defined by the legs 68 of the spider is the expansion spring 70 which is supported on the plate 67 at one end and at its other end it engages the valve disk 71 and forces it to position against the edge of the opening 62 to normally maintain this opening closed.

Within the outer end of the can 33 there is positioned between the wall 36 and the plate 55 of the filter body, a spring member which is generally designated 72. This spring member is of special design in that it is cut or stamped from a single piece of suitably resilient or springy metal, and has the central portion 73 which is here shown in FIG. 4 as being a rectangular flat plate, and the relatively wide, outwardly extending resilient arms 74. These arms all lie on the same side face of the central part 73 and are oblique to that face and the outer ends of the arms, which are transversely rounded, lie in the same plane which is offset from and parallel to the said face of the central part 73. This spring 72 has an overall diameter less than the inside diameter of the can as shown in FIG. 1, and it is placed between the outer end of the filter body and the outer end wall 36 of the can with the central part or plate 73 bearing against the plate 55 and the outer ends of the arms engaging the inner surface of the sloping wall 36.

The central part 73 of the spring has an opening 75 which is concentric with the opening 62 of the plate 55.

When the filter body 36 is introduced into the can, the outer end plate will be pressed firmly against this spring 72 and the spring arms 74 will be pressed against the wall 36 and will be flexed so that the spring will normally tend to urge the filter unit toward the inner end of the can for the purpose which will hereinafter be apparent. It will be seen that the radial extent of the arms of the spring is such that they cannot straighten without coming into contact with the side wall of the can, thereby enforcing the desired spring action. This spring is particularly well adapted for use in a filter of the construction here disclosed as the spring action has a non-linear characteristic which makes for easy application of the inner end wall 37 and builds up a load quicker than would a coil spring in the same position.

Between the inner end of the filter unit 34 and the valve plate 46 there is positioned the relatively thin valve disk 76 which has a central opening 77 to receive the inwardly extending nipple 48. This valve disk is perfectly flat and is designed to lie flat upon the inner surface of the plate 46 to cover and close the openings 47. The valve disk 76 has cut from the peripheral or marginal portion thereof a number of circumferentially directed sections which stand up or are positioned at their free ends above the face of the disk 76 which is opposed by the end plate 54 of the filter body and these sections of the disk form arcuate spring fingers which are designated 78 and which press at their free ends against the opposing face of the plate 54, as shown in FIG. 1. Thus it will be seen that when the parts of the filter structure are assembled, that is, when the filter unit 34 and spring 72 are placed in the can and the inner end wall 37 is fixed in position with the valve disk 76 interposed between the plate 54 and the valve plate 46, the spring 72 will hold the filter body in position against the nipple 48 with the inner end of the nipple pressing against the gasket 65 and the spring fingers 78 will firmly press the valve disk 76 against the adjacent face of the valve plate 46 to close the holes 47.

The attachment of the filter structure to the adapter plate 25 and the attachment of the adapter plate 25 to the engine block is effected by means of a coupling nipple 79 which intermediate its ends carries the encircling flange 80 and which is screw threaded on both ends, as illustrated. One end of the nipple 79 extends through the opening in the center of the adapter plate 25 and is threaded into the flanged nipple 24 which in turn is threaded into the fluid return port 16 of the engine block and the flange 80 presses against the outer side of the central part 32 of the adapter plate to maintain the latter in position within the area defined by the rib 20. The opposite end of the nipple 79 projects outwardly a substantial distance beyond the plane of the deck portion 30 of the adapter plate so as to enter the threaded nipple 48 which forms an integral part of the filter structure, more specifically an integral part of the valve plate 46, as illustrated. When the filter body is threaded onto the outer end of the nipple 79 the gasket 44 will be brought to bear against the deck portion 30 of the adapter plate to form a fluid-tight joint and there will then be provided between the inner end of the filter structure and the frusto-conical wall portion of the adapter plate a circular space around the outer end of the nipple 79 which will receive oil to be filtered which flows out of the port or passage 14.

With the structure thus described, when the filter and adapter plate are mounted in place for use, it will be seen that oil leaving the engine under pressure will pass through the aligned apertures 45 and 47 in the inner end wall of the filter structure by forcing the valve disk 76 inwardly against the resistance of the spring fingers 78. The oil must then flow radially outwardly and pass through the passages 60 between the ribs 58 of the inner plate 54 into the area 61 surrounding the fluted filter material. Some of this oil will, of course, pass into and fill the chamber at the outer end of the can, but the tension of the spring 70 is sufficient to keep the valve disk 71 closed under normal operating pressure. Consequently, the oil will flow radially inwardly through the fluted filter material and enter the central reinforcing tube 50 to return in filtered form to the oil gallery of the engine by way of the nipple 79 and the port 16.

In the event that the filter material becomes clogged to the extent that the flow of oil is materially restricted or completely cut off, there will be sufficient build-up of pressure within the can to force the valve 71 to open position against the resistance of the spring 70. Thus there will be maintained, even though the filter becomes fully clogged, a flow of oil through the detachable filter structure.

When the oil pump ceases operating, the spring fingers 78 will immediately re-seat the disk 76 to close the openings 47 and thus the fitler will be kept filled with oil at all times ready to supply the engine oil gallery when the pump is again started.

In addition to the foregoing, the anti-drain-back valve embodying the plate 46 and disk 76, will permit removal of the filter structure from the adapter plate without draining oil out after the seal has been broken between the gasket 44 and the adapter plate, thereby providing for the clean removal of an old filter structure for replacement.

While in the foregoing description, which has been directed mainly to the construction as shown in FIG. 1, reference has been made to the conventional baffle plate 22 which is shown left in position under the improved plate 25, it is contemplated to mount the improved adapter plate 25 in position over the sump 12 with its periphery resting directly upon the gasket 21 and eliminate the baffle plate 22 together with the coupling nipple 24 which is commonly employed for holding it in position. FIG. 6 illustrates this arrangement where it will be seen that the inner part 32 rests directly upon the flange 21ª which defines the port 16, and the coupling nipple, which is here generally designated 79ª, is threaded at one end directly into the port 16 engaging the threads in the wall of the port instead of being threaded into the conventional nipple such as that shown at 24 in FIG. 1. Otherwise the arrangement and construction of the parts is the same as hereinbefore described.

While in the foregoing description the inner wall 37 and the valve plate 46 have been shown and described as separate parts, these may be formed as a single unit, if desired. When formed in two parts as shown, the plate 46 will be fixed to the thinner wall 37 in a suitable manner, as by spot welding or the like, as indicated at 46ª.

I claim:

1. A throw-away oil filter for internal combustion engines comprising a casing closed at one end and a reinforced closure means at the other end, the reinforced closure means having oil inflow opening means and oil outflow opening means, a filtering element in the casing and filling a substantial volume thereof and spaced from the reinforced closure means, a substantially flat anti-drainback disc valve means of such dimensions as to extend over the oil inflow opening means in the reinforced closure means, the valve positioned in the space between the filtering element and the reinforced closure means and normally closing the inflow opening means, the valve means having in operative association therewith integral spring means extending out of the plane of the valve and engaging the filtering element for normally maintaining the valve in its closed position thus allowing the valve means to move in said space away from the reinforced closure means to allow oil to enter the casing and to pass through the filtering element and out of the casing through the oil outflow opening means.

2. A throw-away filter as defined in and by claim 1, wherein the integral spring means is finger means.

3. A throw-away oil filter as defined in and by claim 2, wherein the disc valve means with the spring finger means thereon is substantially flat throughout its dimensions, and the over-all dimensions of the valve disc being substantially equal to the over-all dimensions of the reinforced closure means of the casing.

4. A throw-away filter as defined in and by claim 3, wherein the spring finger means are a plurality of spring fingers out of the plane of the disc and the spring fingers being spacedly positioned about the marginal portions of the disc.

5. A throw-away type filter as defined in and by claim 1, wherein the anti-drainback valve is in the form of a disc with spring fingers thereon, and the filtering medium within the casing is comprised of a plurality of longitudinally extending pleats of paper which extend about a foraminous center tube in the casing and there being an end cap on the respective ends of the pleated paper filtering medium, the end caps having flanges extending over marginal end portions of the pleated filter medium, each of the flanges having thereon a plurality of spaced outstanding ribs with passageways therebetween, the ribs engaging spaced inner wall portions of the casing and thus positioning the pleated filter element within the casing and spacing the peripheral edges of the pleated element from the inner wall of the casing thereby providing a chamber for reception of oil therein prior to its entering the pleated filtering medium.

6. A throw-away filter as defined in and by claim 1, wherein the closure means with the inflow opening means therein is a substantially rigid disc, in part closing one end of the casing, and fitting rather snugly within an end of the casing, the anti-drainback valve means being in the form of a thin disc relative to the thickness of the said rigid disc on which it directly engages, said thin disc having spring fingers thereon positioned in said space between one end of the filter element in the casing and the said rigid disc.

7. The oil filter as defined in and by claim 6, wherein a partial end closure is seamed to an end of the casing and extends radially inwardly toward the axial center thereof, and the rigid disc is snugly positioned within the casing inwardly of said seam and substantially closes the end of the casing and completes the closure at the said one end of the casing with the said radially inwardly extending partial end closure to which it is secured.

8. A throw-away oil filter for internal combustion engines or the like, the filter comprising a casing having a hollow body with an inner wall, the body having one end integral therewith and the other end thereof reinforced, a hollow foraminous tube fixed centrally in the casing, a filter element in the casing comprising a filter medium of pleated paper about the tube, the pleated paper having circumferential outer edges and opposite end edges, an end cap fixed at each end edge of the filter paper, each of the end caps having a body portion, a central portion, and a rim portion, the rim portion comprising flanges substantially at right angles to the body and overlapping marginal end portions of the circumferential outer edges of the pleated filter medium, each flange of each cap having circumferentially spaced outwardly extending ribs and providing passageways therebetween, the ribs of the flanges engaging spaced portions of the said inner wall of the casing and thus spacing the circumferential outer edges of the pleated filter medium from the inner wall of the casing and providing a surrounding chamber for oil passing through the said passageways between the ribs on the end caps, one end cap adjacent the integral end of the casing having a centrally disposed opening therein, a spider supported by the body portion of the said one end cap adjacent its opening and extending into the hollow foraminous tube, a spring supported within the spider in the tube, a high-pressure relief valve within the spider engaged by the spring, the high pressure valve engaging the body portion of the said one end cap and normally closing the opening therein under force of the spring, a spring means having a central opening between said one end cap and the said integral end of the casing and thus resiliently urging the filter element toward the reinforced end of the casing, the said opening in the spring means being concentric with the opening in the said one end cap, the reinforced end of the casing comprising a partial end wall seamed to the body of the casing and a reinforcing plate of a thickness greater than the thickness of the said partial end wall and affixed to the said partial end wall, the reinforcing plate being of slightly less dimensions than the inner wall of the casing and positioned in the casing inwardly of the said seam, the partial end wall and the reinforcing plate comprising the closure for the reinforced end of the casing, the reinforcing plate having a plurality of oil inflow openings therein and a central inwardly extending internally threaded flange forming a wall for an outflow opening and providing means for attaching the filter to a mounting, the other of the end caps being adjacent to the closed end of the casing, the said other end cap having a central opening therein concentric with the said foraminous tube, a sealing ring adjacent and surrounding the opening in the said other end cap and sealingly engaging the reinforcing plate, an anti-drainback valve comprising a thin, flat disc having arcuate spring fingers integral therewith out of the plane of the disc, the disc positioned between the reinforcing plate and said other end cap and being of such dimensions as to extend over the oil inflow openings, said spring fingers engaging said other end cap and thus resiliently urging the valve disc over the oil inflow openings in the reinforcing plate but allowing the valve disc to flex away from the reinforcing plate on flow and pressure of the oil from the internal combustion engine thus opening the oil inflow opening to permit the oil to enter the casing and flow through the passageways between the ribs of the end caps into the chamber surrounding the pleated paper through the pleated paper so as to be filtered thereby into the central foraminous tube and then through the oil outflow opening, but upon a clogging of the pleated paper filtering medium the said high pressure relief valve adjacent the integral end opens thus allowing the oil to bypass the clogged pleated paper filter and flow directly into the foraminous central tube and through the oil outflow opening in the reinforcing plate.

References Cited by the Examiner

UNITED STATES PATENTS

| | | | |
|---|---|---|---|
| 810,216 | 1/06 | Neeland | 137—516.13 |
| 1,191,628 | 7/16 | Trinks | 210—136 |
| 1,792,854 | 2/31 | McKinley | 210—168 X |
| 1,833,841 | 11/31 | Leinert | 137—516.21 |
| 1,940,316 | 12/33 | McKinley. | |
| 2,221,465 | 11/40 | Aldham | 210—130 |
| 2,275,481 | 3/42 | Wilkinson | 210—133 |
| 2,284,787 | 6/42 | Winkler | 210—443 |
| 2,382,716 | 8/45 | Herzmark | 137—516.11 X |
| 2,418,777 | 4/47 | Le Clair | 210—436 X |
| 2,556,292 | 6/51 | Newcum | 210—446 X |
| 2,600,480 | 7/52 | Cloedy | 210—444 X |
| 2,748,949 | 6/56 | James | 210—168 X |
| 2,793,752 | 5/57 | Jay | 210—130 |
| 2,877,902 | 3/59 | Chase et al. | 210—171 X |
| 2,884,133 | 4/59 | Walulik et al. | 210—171 X |

FOREIGN PATENTS

| | | |
|---|---|---|
| 25,690 | 7/11 | Great Britain. |
| 702,168 | 1/54 | Great Britain. |
| 95,604 | 5/39 | Sweden. |

OTHER REFERENCES

"Lincoln-Mercury . . . Adopt New Easy Change Full Flow Oil Filter"; Pamphlet pub. by Farm Corp., Providence 16, R.I., on Oct. 2, 1956.

REUBEN FRIEDMAN, *Primary Examiner.*

HARRY B. THORNTON, HERBERT L. MARTIN, KARL KRAFT, ALEXANDER WYMAN, *Examiners.*